United States Patent [19]

White et al.

[11] Patent Number: 4,472,551
[45] Date of Patent: Sep. 18, 1984

[54] ONE PACKAGE, STABLE, MOISTURE CURABLE, ALKOXY-TERMINATED ORGANOPOLYSILOXANE COMPOSITIONS

[75] Inventors: Mary A. White, El Cerrito, Calif.; John E. Hallgren, Scotia; Thomas P. Lockhart, Schenectady, both of N.Y.

[73] Assignee: General Electric Company, Schenectady, N.Y.

[21] Appl. No.: 481,524

[22] Filed: Apr. 1, 1983

[51] Int. Cl.$^3$ .................. C08G 77/06; C08K 5/04; C08K 5/15

[52] U.S. Cl. .................. 524/728; 524/751; 524/761; 524/769; 524/773; 524/860; 524/863; 528/15; 528/17; 528/18; 528/21; 528/23; 528/26; 528/27; 528/29; 528/33; 528/34; 528/901

[58] Field of Search .............. 524/860, 863, 751, 728, 524/773, 751, 769; 528/901, 15, 17, 18, 21, 23, 26, 27, 29, 33, 34

[56] References Cited

U.S. PATENT DOCUMENTS

| | | |
|---|---|---|
| 2,607,792 | 8/1952 | Warrick . |
| 3,035,016 | 5/1962 | Bruner . |
| 3,065,194 | 11/1962 | Nitzsche et al. . |
| 3,070,559 | 12/1962 | Nitzsche et al. . |
| 3,122,522 | 2/1964 | Brown et al. . |
| 3,127,363 | 3/1964 | Nitzsche et al. . |
| 3,133,891 | 5/1964 | Ceyzeriat . |
| 3,153,007 | 10/1964 | Boot . |
| 3,161,614 | 12/1964 | Brown . |
| 3,184,427 | 5/1965 | Russell et al. . |
| 3,240,731 | 3/1966 | Nitzsche et al. . |
| 3,296,161 | 1/1967 | Kulpa . |
| 3,296,195 | 1/1967 | Goossens . |
| 3,334,067 | 8/1967 | Weyenberg . |
| 3,438,930 | 4/1969 | Beers . |
| 3,518,286 | 6/1970 | Pande et al. . |
| 3,542,901 | 11/1970 | Cooper et al. . |
| 3,632,557 | 6/1972 | Brode et al. . |
| 3,647,917 | 3/1972 | Schulz et al. . |
| 3,677,996 | 7/1972 | Kaiser et al. . |
| 3,689,454 | 9/1972 | Smith et al. . |
| 3,779,986 | 12/1973 | Smith et al. . |
| 3,819,563 | 6/1974 | Takago et al. . |
| 3,872,054 | 3/1975 | Shaw .................. 528/34 |
| 3,886,118 | 5/1975 | Nitzsche et al. . |
| 4,176,111 | 11/1979 | Cella .................. 528/18 |
| 4,180,642 | 12/1979 | Takago . |
| 4,223,122 | 9/1980 | Cella . |
| 4,242,252 | 12/1980 | Newing .................. 524/728 |
| 4,248,993 | 2/1981 | Takago . |
| 4,257,932 | 3/1981 | Beers . |
| 4,257,957 | 3/1981 | Cella . |
| 4,294,975 | 10/1981 | Takago . |
| 4,301,269 | 11/1981 | Hashimoto et al. . |
| 4,302,571 | 11/1981 | Arai et al. . |
| 4,304,920 | 12/1981 | Arai et al. . |
| 4,323,488 | 4/1982 | Takago et al. . |
| 4,339,563 | 7/1982 | Takago et al. . |
| 4,376,192 | 3/1983 | Takago et al. .................. 528/18 |
| 4,388,433 | 6/1983 | Klein et al. .................. 528/18 |
| 4,395,507 | 7/1983 | Dziark et al. .................. 524/773 |
| 4,395,526 | 7/1983 | White et al. .................. 528/18 |
| 4,417,042 | 11/1983 | Dziark .................. 528/33 |
| 4,424,157 | 1/1984 | Chung .................. 528/901 |

FOREIGN PATENT DOCUMENTS 2640328 8/1976 Fed. Rep. of Germany .

OTHER PUBLICATIONS

Chemistry and Technology of Silicones, W. Noll, Academic Press, New York, 1968, p. 397.
Encyclopedia of Chemical Technology, Kirk-Othmer, 3rd Ed., vol. 13, John Wiley & Sons, New York, pp. 874–893.

Primary Examiner—Herbert J. Lilling
Attorney, Agent, or Firm—William A. Teoli; James C. Davis, Jr.; James Magee, Jr.

[57] ABSTRACT

Stable, substantially acid-free, one package moisture curable alkoxy-terminated organopolysiloxane compositions are provided having a condensation catalyst such as a tin compound and a silicon-free scavenger, such as an organic scavenger, for materials having chemically combined hydroxy radicals.

13 Claims, No Drawings

ONE PACKAGE, STABLE, MOISTURE CURABLE, ALKOXY-TERMINATED ORGANOPOLYSILOXANE COMPOSITIONS

CROSS REFERENCE TO RELATED APPLICATIONS

Reference is made to copending application of John E. Hallgren, Ser. No. 277,525 now U.S. Pat. No. 4,377,706, for Polyalkoxysilylenolethers and method for making, White et al, Ser. No. 277,524 now U.S. Pat. No. 4,395,526, for One Package, Stable, Moisture Curable, Polyalkoxy-Terminated Organopolysiloxane Compositions and Method for Making, the aforesaid applications were filed concurrently on June 26, 1981, and John J. Dziark, for Scavengers for One Component Alkoxy Functional RTV Compositions and Process, Ser. No. 349,695, filed Feb. 17, 1982. Reference is also made to the copending applications of Thomas P. Lockhart, Ser. No. 481,529, Ser. No. 481,527, Ser. No. 418,528, Ser. No. 481,530, for One Package, Stable, Moisture Curable, Alkoxy-Terminated Organopolysiloxane Compositions, and Ser. No. 481,526, for A Method for Making an Enoxy Stabilized Room Temperature Vulcanizable Organopolysiloxane Composition Which Resists Color Change Upon Aging, filed concurrently herewith, where all of the aforesaid applications are assigned to the same assignee as the present invention and incorporated herein by reference. Reference is also made to application Ser. No. 476,000 filed Mar. 17, 1983, Swiger et al, for Scavengers For One Component RTV Compositions, filed on or about Mar. 18, 1983 and assigned to the same assignee as the present invention.

BACKGROUND OF THE INVENTION

Prior to the present invention, various one and two-package moisture curable room temperature vulcanizable (RTV) compositions were available based on the use of a silanol-terminated polydiorganosiloxane having the formula,

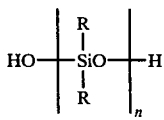

$$HO \left[ \begin{array}{c} R \\ | \\ SiO \\ | \\ R \end{array} \right]_n H \quad (1)$$

where R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof and n is an integer having a value of from about 50 to about 2500, with a cross-linking silane having hydrolyzable radicals attached to silicon.

Ceyzeriat, U.S. Pat. No. 3,133,891 and Bruner, U.S. Pat. No. 3,035,016, are based on the use of methyltriacetoxysilane with a silanol-terminated polydimethylsiloxane under substantially anhydrous conditions. Although the one-package compositions of Bruner or Ceyzeriat, upon exposure to atmospheric moisture, provide satisfactory one-package room temperature vulcanizable organopolysiloxane compositions exhibiting satisfactory tack-free time, for example, 30 minutes or less after an extended shelf period, the acetic acid byproduct is corrosive and has a disagreeable odor.

Other variations of one-package acyloxy acid generating RTV's are shown by Kulpa, U.S. Pat. No. 3,296,161, Goossens, U.S. Pat. No. 3,296,195 and Beers, U.S. Pat. No. 3,438,930, assigned to the same assignee as the present invention. Additional one-package acyloxy acid generating RTV compositions are shown by Schulz et al, U.S. Pat. No. 3,647,917 and Nitzsche et al U.S. Pat. No. 3,886,118.

An improved, low odor, substantially non-corrosive one-package RTV composition is shown by Beers, U.S. Pat. No. 4,257,932, assigned to the same assignee as the present invention. Beers achieves a reduction in odor and corrosive properties by utilizing as a cross-linking silane, a less volatile material such as methyltris-(2-ethylhexanoxy)silane.

A non-corrosive two package moisture curable organopolysiloxane composition free of carboxylic acid generating groups is shown by Nitzsche et al, U.S. Pat. No. 3,127,363 which is based on the use of a polyalkoxysilane, or polysilicate cross linking agent, in place of methyltriacetoxysilane. The ingredients of the two package noncorrosive composition of Nitzsche et al, are mixed under atmospheric conditions and the resulting composition must be used soon after the ingredients are mixed because the resulting blend has a short shelf life. Although the mixture of Nitzsche et al, which is typically polyalkoxysilane, silanol-terminated polydiorganosiloxane and tin soap catalyst, provides upon mixing, a fast curing non-corrosive room temperature vulcanizable composition, the Nitzsche et al mixture does not have the extended shelf life advantage of the one package system which is required for various commercial uses and therefore is excluded from a variety of applications.

Nitzsche et al, U.S. Pat. No. 3,065,194, teaches that a mixture of an endblocked dimethylsiloxane polymer, such as hydroxy and alkoxy endblocked, inert filler, ethylorthosilicate and dibutyltindilaurate can be vulcanized upon contact with water, after a 14 day shelf period at room temperature. However, the various ingredients of the mixture have to be vigorously dried by heating for 1 hour at 200° C., and the RTV, after a relatively short shelf period, has to be drenched with water.

Improved results toward combining the advantages of a non-corrosive acid-free polyalkoxysilane cross-linking agent with a silanol-terminated polydiorganosiloxane as a one-package system are shown by Weyenberg, U.S. Pat. No. 3,334,067, Cooper et al, U.S. Pat. No. 3,542,901 and by Smith et al U.S. Pat. Nos. 3,689,454, and 3,779,986, the last two being assigned to the same assignee as the present invention, utilizing a titanium chelate catalyst in place of a tin catalyst. However, after room temperature vulcanizable one-package systems based on a titanium chelate catalyst were allowed to age for a period of 5 hours or more, it was found that the tack-free time of the aged RTV was considerably longer than the tack-free time of the same mixture after it was initially mixed and immediately exposed to atmospheric moisture.

As shown by Brown et al U.S. Pat. No. 3,122,522, a platinum catalyst is used to prepare an alkoxy terminated silalkylenepolysiloxane polymer. However, this method of synthesizing the base polymer requires an expensive hydrosilylation procedure. Additional efforts to achieve a desirable non-corrosive, substantially odor-free stable one-package RTV based on the use of polyalkoxy organopolysiloxane in a more economic manner are shown by Brown et al, U.S. Pat. No. 3,161,614 or U.S. R. 29760. Brown et al employed a polyalkoxy end blocked polysiloxane which was based on the use of a mineral acid generating polyalkoxyhalosilane, and a curing catalyst. However, these compositions were found to be unusable because they failed to cure in contact with a tin catalyst, even in the presence of moisture.

As utilized hereinafter, the term "stable" as applied to the one package alkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

In copending application Ser. No. 277,524, filed June 26, 1981, White et al, for One Package, Stable, Moisture Curable, Polyalkoxy-terminated Organopolysiloxane Compositions and Method for Making, assigned to the same assigned as the present invention, room temperature vulcanizable compositions are shown based on the use of a polyalkoxy terminated polydiorganosiloxane in combination with certain silane scavengers for materials having chemically combined hydroxy radicals.

Although valuable, substantially acid-free products have been obtained with the use of such silane scavengers which also can function as stabilizer in the room temperature vulcanizable organopolysiloxane compositions of Ser. No. 277,524, it has been found that the use of such silane scavengers can result in the production of undesirable by-products during the cure of the RTV composition. The aforementioned undesirable by-products, such as amides, amines, carbamates, oximes, can be generated which can interfere with the utility of the RTV composition. In addition, in view of the special procedures required to synthesize such silane scavengers, and the cost of materials used in such synthesis, the overall cost of the RTV composition can be significantly enhanced.

The present invention is based on the discovery that stable, substantially acid-free, one package, moisture curable RTV compositions can be made by utilizing a silicon-free scavenger, or organic scavenger, in place of the above described silane scavenger. Accordingly, these organic scavengers, as defined hereinafter, can be advantageously used in combination with alkoxy terminated polydiorganosiloxane of the formula,

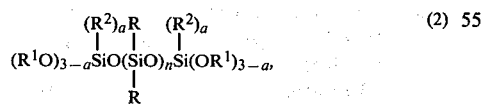

where R and n are as previously defined, $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, and a is a whole number equal to 0 to 2 inclusive. It has been found that there can be utilized from about 0.1 to about 10 parts of the silicon-free scavenger or organic scavenger of the present invention per 100 parts of the alkoxy-terminated polydiorganosiloxane of formula (2) or the silanol terminated polydiorganosiloxane of formula (1). Preferably, 1 or 2 parts per 100 parts of organopolysiloxane polymer can be used.

In addition, in certain instances, organic amines can function as curing accelerators in combination with the above described organic scavengers. Furthermore, there can be utilized in the room temperature vulcanizable compositions of the present invention cross-linking polyalkoxysilane having the formula,

where $R^1$ is as previously defined, $R^2$ is a $C_{(1-13)}$ monovalent organic radical selected from R radicals and b is a whole number equal to 0 or 1.

As a result of the substitution of the organic scavenger for the silane scavenger as previously discussed, the RTV compositions of the present invention can be made at substantially reduced costs. Based on experience with the use of compatible organic materials with silicones, those skilled in the art would anticipate that the paintability of the surfaces of tack-free cured products obtained from RTV compositions of the present invention would be enhanced as compared to cured products derived from prior art RTV compositions.

STATEMENT OF THE INVENTION

There is provided by the present invention, a one-package, substantially anhydrous, room temperature vulcanizable organopolysiloxane composition stable under ambient conditions in the substantial absence of moisture over an extended period of time and convertible to a substantially acid-free, tack-free elastomer comprising by weight, (A) an organopolysiloxane wherein the silicon atom at each polymer chain end is terminated with at least one alkoxy radical, (B) an effective amount of condensation catalyst (C) from 0 to 0.1 part, per part of the alkoxy terminated organopolysiloxane of (A) of a cross-linking polyalkoxysilane of formula (3)

(D) 0 to 0.05 part, per part of the alkoxy terminated organopolysiloxane of an amine accelerator and (E) a stabilizing amount of an organic material having at least one alcohol reactive functional group which is suitable as a scavenger for hydroxy radicals and which has a molecular weight in the range of from about 40 to about 1,000 and consists essentially of a mixture of chemically combined atoms selected from C, H, N, O, P, S, Cl, F, Br and I.

Radicals included within R of formulas (1) and (2) are, for example, aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included within $R^1$ are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. Radicals included within $R^2$ are the same or different radicals included within R radicals. In formulas (1-3), where R, $R^1$, and $R^2$, can be more than 1 radical, these radicals can be the same or different.

The organic scavengers which can be used in the practice of the present invention include a variety of well known materials which can be found in a standard text on organic chemistry such as J. March, Advanced Organic Chemistry, 2nd Ed., McGraw-Hill, New York (1977). There are included, for example, alkenyl carboxylates having the formula,

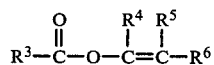 (4)

where $R^3$, $R^4$ and $R^5$ are selected from the same or different monovalent radicals selected from hydrogen, $C_{(1-13)}$ hydrocarbon radicals and $C_{(1-13)}$ substituted hydrocarbon radicals and $R^6$ is selected from $C_{(1-13)}$ monovalent hydrocarbon radicals and substituted monovalent hydrocarbon radicals.

Some of the alkenyl carboxylates which can be used in the practice of the present invention are, for example, isopropenyl acetate, vinyl acetate, but-2-ene-3-yl acetate, isopropenyl propionate, vinyl propionate, cyclohexenyl acetate, cyclopentyl acetate.

Additional organic scavengers which also can be used are, for example, ketenes such as dimethylketene, or diphenylketene; lactones, such as methylene butyrolactone, beta-butyrolactone, epsilon-caprolactone, 3-hydroxy-2,2,4-trimethyl-3-pentanoic acid-beta-lactone; vinyl ethers such as 4,5-dihydro-2-methylfuran, butylisopropenylether; carbodiimide derivatives such as cyclohexylcarbodiimide; isocyanates such as, phenylisocyanate, cyclohexylisocyanate, and toluene diisocyanate; and carboxylic acid anhydrides, for example, acetic anhydride, benzoic anhydride, etc.

The alkoxy-terminated organopolysiloxane of formula (2), can be made by various procedures. One procedure is taught by Cooper et al U.S. Pat. No. 3,542,901 involving the use of a polyalkoxysilane with a silanol-terminated polydiorganosiloxane in the presence of an amine catalyst. For example, a cross-linking silane of formula (3) can be used in accordance with Cooper et al's method to end-cap a silanol-terminated polydiorganosiloxane of formula (1).

In formulas (1-3), R is preferably selected from $C_{(1-13)}$ monovalent hydrocarbon radicals, halogenated hydrocarbon radicals and cyano alkyl radicals, $R^1$ is preferably a $C_{(1-8)}$ alkyl radical or a $C_{(7-13)}$ aralkyl radical, $R^2$ is preferably methyl, phenyl, or vinyl.

Some of the cross-linking polyalkoxysilanes included within formula (3) are, for example, methyltrimethoxysilane; methyltriethoxysilane; ethyltrimethoxysilane; tetraethoxysilane; vinyltrimethoxysilane; etc.

Among the amine accelerators which can be used to accelerate the cure of the RTV composition of the present invention there are included silyl substituted guanidines having the formula, $$(Z)_g Si(OR^1)_{4-g},$$ (5)

where $R^1$ is as previously defined, Z is a guanidine radical of the formula,

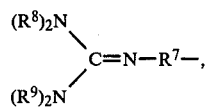

$R^7$ is divalent $C_{(2-8)}$ alkylene radical, $R^8$ and $R^9$ are selected from hydrogen and $C_{(1-8)}$ alkyl radicals and g is an integer equal to 1 to 3 inclusive. In addition, alkyl substituted guanidines having the formula,

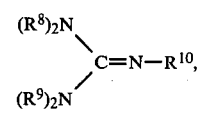

where $R^8$ and $R^9$ are as previously defined and $R^{10}$ is a $C_{(1-8)}$ alkyl radical, also can be employed. Some of the silyl substituted guanidines included within formula (8) are shown by Takago U.S. Pat. Nos. 4,180,642 and 4,248,993.

In addition to the above described amine accelerators, additional nitrogen bases which can be used as accelerators in combination with the above-described organic scavengers are for example, compounds containing amidine, amine oxide, aminopyridine, azo, azomethine, azoxy, cyanate, hydrazide, hydrazine, hydrazone, imine, isocyanate, isothiocyanate, oxazone, nitroso, thiocyanate, thiourea, urea, and urethane functionalities and nitrogen containing heterocyclics such as imidazoles, imidazolines, isoxazoles, lactams, oxazoles, purines, pyrazines, pyrazoles, pyrazolines, pyrimidines, pyrroles, thiazoles, N-methylimidazole 1,5-diazabicyclo[4.3.0]non-5-ene, 1,8-diazabicyclo[5.4.0]undec-7-ene, N,N,N',N'-tetramethyl-1,3-diaminopropane, N,N'-dimethylpiperazine, N,N,N',N'-tetraethylethylenediamine, 4-(N,N-dibutyl(amino)pyridine, and 4-(4'methylpiperidyl)pyridine.

In addition to the above substituted guanidines, there can be used various amines, for example, di-n-hexylamine, dicyclohexylamine, di-n-octylamine, and hexamethoxymethylamine. Preferably, amine accelerators useful with isocyanate scavengers are preferably free of —NH functional groups.

As previously described the alkoxy terminated organopolysiloxane of formula (2) can be made by using a polyalkoxysilane with a silanol-terminated polydiorganosiloxane. The silanol-terminated polydiorganosiloxanes which can be used to make the polyalkoxyorganopolysiloxanes are well known and preferably have a viscosity in the range of from about 100 to about 400,000 centipoise and more preferred from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (1), are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.K. Pat. No. 835,790.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of formula (1). There are included tin compounds, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example stirring, a mixture of materials which can consist of the polyalkoxy terminated diorganopolysiloxane, organic scavenger, cross-linking silane of formula (3) which can be optional, and amine accelerator, where the blending is performed in a substantial absence of atmospheric moisture. Thereafter, the condensation catalyst is added also in the substantial absence of atmospheric moisture.

As used hereinafter, the expressions "moisture-free conditions" and "substantially anhydrous conditions", with reference to making the RTV compositions of the present invention, mean mixing in a dry box, or in a closed container which has been subjected to vacuum to remove air, which therefter is replaced with a dry inert gas, such as nitrogen. Temperatures can vary from about 0° C. to about 180° C. depending upon the degree of blending, the type and amount of filler.

A preferred procedure for making the RTV compositions of the present invention is to agitate under substantially anhydrous conditions, a mixture of the polyalkoxy terminated organopolysiloxane, filler, along with an amount of polyalkoxysilane of formula (3) sufficient to effect the substantial elimination of hydroxy functional groups in the mixture. This "end-capping" procedure can require several minutes, hours, or even days, depending upon such factors as the amount of silanol on the filler, the nature of the $OR^1$ radical on the cross-linking silane, etc. There then can be added to the substantially silanol-free mixture the condensation catalyst, cross-linking silane or mixture thereof, along with other ingredients, for example, the curing accelerator and pigments.

In order that those skilled in the art will be better able to practice the invention, the following examples are given by way of illustration and not by way of limitation. All parts are by weight.

EXAMPLE 1

A room temperature vulcanizable one package methylpolysiloxane composition was prepared in the absence of moisture utilizing a methyldimethoxysiloxy terminated polydimethylsiloxane, methyltrimethoxysilane, isopropenyl acetate, dibutyltindiacetate, and tetramethyl-N-butylguanidine. The methyldimethoxysiloxy terminated polydimethylsiloxane was prepared in situ utilizing a silanol terminated polydimethylsiloxane having 0.09% by weight of chemically combined OH radicals. More particularly, there was utilized 100 parts of the silanol terminated polydimethylsiloxane, 3 parts of the methyltrimethoxysilane, 1.06 part of isopropenyl acetate, 0.1 part dibutyltindiacetate and 0.3 part of tetramethyl-N-butylguanidine. The following mixtures were prepared showing the weight of each reactant in parts in the mixtures, where silanol polymer is the silanol-terminated polydimethylsiloxane, cross-linker is methyltrimethoxysilane, condensation catalyst is dibutyltindiacetate, and the amine accelerator is $(CH_3)_2N)_2C=NC_4H_9$:

TABLE I

| Composition | Silanol polymer | Cross linker | Condensation catalyst | Isopropenylacetate | Amine |
|---|---|---|---|---|---|
| 1 | 20 | 0.60 | 0.10 | 0.21 | 0.06 |
| 2 | 20 | 0.60 | 0.10 | 0.21 | — |
| 3 | 20 | 0.60 | 0.10 | — | 0.06 |
| 4 | 20 | 0.60 | 0.10 | — | — |

The above mixtures were heated at 50° C. in the absence of moisture. The following results were obtained using composition 1, where TFT is tack-free time:

TABLE II

| Time of Aging at 50° C. (days) | TFT (min) |
|---|---|
| 0 | <30 |
| 1 | <90 |
| 2 | 70 |
| 4 | 45 (surface tacky) |

The above results show that the compositions of the present invention exhibit satisfactory stability and have a reasonably fast tack-free time. Composition 2 of Table I, free of the amine, did not cure after 7 hours when measured from time 0. Compositions 3 and 4 free of the isopropenylacetate were semicured (gelled but tacky) after 7 hours. After 4 days at 50° C., composition 2 cured slowly and compositions 3 and 4 did not cure.

EXAMPLE 2

A mixture of 100 parts of methyldimethoxy terminated polydimethylsiloxane having a viscosity in the range of about $120 \times 10^3 - 170 \times 10^3$ centipoise at 25° C. and 0.2 part of dibutyltindiacetate was mixed with two parts of phenylisocyanate. A similar mixture was prepared free of the phenylisocyanate. The mixtures were then aged at a temperature of 102° C. for a period of from 0 to 44 hours during which time tack-free times were determined. The formulations were prepared in a drybox in an inert atmosphere from which atmospheric moisture was completely excluded. Samples were heat aged in small sealed vials and placed in a 102° C. oil bath within the drybox. After the aging period, the samples were placed in an aluminum pan in a 58% humidity chamber. The samples were periodically removed to determine their tack-free time (TFT). The following results were obtained:

TABLE III

| Tack Free Time After Aging at 102° C. | | | |
|---|---|---|---|
| | 0 hr | 20 hr | 44 hr |
| (1) No Scavenger | 60–80 min | >23 hr | >23 hr |
| (2) Phenylisocyanate | ~80 min | ~80 min | ~90 min |

The above results show that the presence of phenylisocyanate stabilized the RTV formulation to a significant degree.

EXAMPLE 3

An additional room temperature vulcanizable mixture was prepared under substantially anhydrous conditions consisting of 100 parts of the methyldimethoxy end-capped polydimethylsiloxane of Example 2, 2 parts of cyclohexylisocyanate, 0.2 part of dibutyltindiacetate and 0.6 part of N-methylimidazole. The resulting RTV composition was heat aged at 95° C. for 48 hours. It was found that the TFT (min) of the RTV before heat aging was 83 minutes and 45 minutes after heat aging.

EXAMPLE 4

Various RTV formulations were prepared under substantially anhydrous conditions consisting of 100 parts of the methyldimethoxy chain-stopped polydimethylsiloxane polymer of Example 2, 0.2 part of dibutyltindiacetate, 0.6 part of an amine accelerator and 2 parts of an organic acyl compound as a stabilizer. The various mixtures were thoroughly mixed and 10 gram samples were poured into glass vials for heat aging in an oil bath at about 95° C. All of the mixtures were prepared in a drybox utilizing a nitrogen atmosphere.

Tack-free times were determined by exposing a 1–2 millimeter thick sample of the RTV to the atmosphere of a 58% humidity chamber. The following results were obtained:

TABLE IV

| Aging at 95 ± 5° C. | TFT (min) After | |
|---|---|---|
| Stabilizer | 0 hr | 42 hr |
| None | 30 min | no cure (sample gelled) |
| $(C_6H_5CO)_2O$ | 3–17 hrs | 2–5 hr |
| $(CH_3CO)_2O$ | 3–17 hrs | 1 hr |

The above procedure was repeated, except that the di-n-hexylamine accelerator was not used in the RTV composition. It was found that the tack-free time after the 42 hour aging period was 8 hours for the benzoic acid anhydride and 4 hours for the acetic anhydride. Acylimidazole was also found to be an effective stabilizer, but did not appear to provide any acceleration as shown by its TFT which exceeded 20 hours.

EXAMPLE 5

An RTV formulation was prepared by adding 2, 3 and 5 parts by weight of 3-hydroxy-2,2,4-trimethyl-3-pentanoic acid-beta-lactone to a mixture of 100 parts of the methyldimethoxy-terminated polydimethylsiloxane of Example 2, 17 parts of silica filler, 30 parts of a polydimethylsiloxane fluid (plasticizer), 0.5 part of methyltrimethoxysilane, 1 part of aminoethylaminopropropyltrimethoxysilane (adhesion promoter), about 0.5 part of di-N-hexylamine and 0.1 part of dibutyltindiacetate.

A storage stability study was conducted with the above formulations at a temperature of 100° C. over a period of from 0 to 48 hours. The following results were obtained:

TABLE V

| | Results after 0, 24, 48 h heat aging at 100° C. at various lactone levels | | | | | | | | |
|---|---|---|---|---|---|---|---|---|---|
| | 2.0 parts | | | 3.0 parts | | | 5.0 parts | | |
| Property | 0 h | 24 h | 48 h | 0 h | 24 h | 48 h | 0 h | 24 h | 48 h |
| *TFT (min) | 105 | 105 | 50 | 105 | 95 | 170 | 100 | 95 | 170 |
| Shore A | 13 | 16 | 14 | 12 | 10 | 12 | 12 | 11 | 10 |
| Tensile | 246 | 203 | 265 | 277 | 263 | 250 | 255 | 290 | 192 |
| Elongation | 711 | 678 | 792 | 781 | 761 | 805 | 790 | 791 | 770 |
| 50% modulus | 27 | 28 | 30 | 30 | 27 | 27 | 25 | 21 | 22 |
| 100% modu- | 40 | 39 | 41 | 41 | 39 | 11 31 | 35 | 30 | 31 |

TABLE V-continued

| | Results after 0, 24, 48 h heat aging at 100° C. at various lactone levels | | | | | | | |
|---|---|---|---|---|---|---|---|---|
| Pro- | 2.0 parts | | | 3.0 parts | | | 5.0 parts | | |
| perty | 0 h | 24 h | 48 h | 0 h | 24 h | 48 h | 0 h | 24 h | 48 h |
| lus | | | | | | | | | |

*Tack Free Time

The above results show that 3-hydroxy-2,2,4-trimethyl-3-pentanoic acid-beta-lactone is effective as a stabilizer for RTV formulations containing methoxy-terminated polydimethylsiloxane and tin catalyst over an extended shelf period. It was found that RTV formulations free of lactone quickly degraded at room temperature and finally after 1 day at 100° C. did not cure at all.

EXAMPLE 6

In accordance with the procedure of Example 5, additional RTV formulations were prepared utilizing 100 parts of a methyldimethoxy end-capped polydimethylsiloxane having a viscosity of about 20–50,000 centipoises at 25° C. 0.2 part of dibutyltindiacetate, 0.6 part of dihexylamine or N-methylimidazole and 2 parts of lactone. In one instance epsilon-caprolactone was used and in another instance beta-butyrolactone was used. The respective RTV formulations were heat aged at 95° C.±5° C. in closed vial in an inert dry atmosphere. The aged samples were tested for tack-free time (TFT) in 58% humidity chamber after they were first cooled to room temperature. The following results were obtained:

TABLE VI

| | | TFT (min) After Heat Aging at 95 ± 5° C. | | |
|---|---|---|---|---|
| Lactone | accelerator | 0 h | 21 h | 46 h |
| None | none | 120 | n.c.* | n.c.* |
| beta-butyrolactone | hex$_2$NH | 48 | 146 | 137 |
| epsilon-caprolactone | hex$_2$NH | 25 | 86 | gelled |
| | N—methyl-imidazole | 58 | 122 | 117 |

*n.c. = no cure after 1 day in humidity chamber

The above results show that lactones can be effective as stabilizers in alkoxy-terminated polydiorganosiloxane RTV formulations in the presence of tin catalyst and a suitable organo nitrogen accelerator.

Although the above Examples are directed to only a few of the very many variables which can be used in the practice of the present invention, it should be understood that the present invention is directed to a much broader variety of room temperature vulcanizable compositions, based on the employment of alkoxy terminated polydiorganosiloxane as shown by formula (2) as well as the use of a much broader variety of organic acyl compounds, polyalkoxysilanes of formula (3), amine accelerator and condensation catalyst as previously defined.

What I claim as new and desire to secure by Letters Patent of the United States is:

1. A one-package, substantially anhydrous, room temperature vulcanizable organopolysiloxane composition stable under ambient conditions in the substantial absence of moisture over an extended period of time and convertible to a substantially acid-free, tack-free elastomer comprising by weight, (A) an organopolysiloxane wherein the silicon atom at each polymer chain end is terminated with at least one alkoxy radical,
(B) an effective amount of condensation catalyst
(C) from 0 to 0.1 part, per part of the alkoxy terminated organopolysiloxane of (A) of a cross-linking polyalkoxysilane of formula (3)
(D) 0 to 0.05 part, per part of the alkoxy terminated organopolysiloxane of an amine accelerator and
(E) a stabilizing amount of an organic material having at least one alcohol reactive functional group which is suitable as a scavenger for hydroxy-containing material having a molecular weight of from about 40 to about 1,000 and consisting essentially of a mixture of chemically combined atoms selected from C, H, N, O, P, S, Cl, F, Br and I.

2. A room temperature vulcanizable composition in accordance with claim 1, where the organic scavenger is an alkenyl carboxylate.

3. A room temperature vulcanizable composition in accordance with claim 1, where the organic scavenger is an organic isocyanate.

4. A room temperature vulcanizable composition in accordance with claim 1, where the organic scavenger is isopropenyl acetate.

5. A room temperature vulcanizable composition in accordance with claim 1, where the organic scavenger is acyl anhydride.

6. A room temperature vulcanizable composition in accordance with claim 1, where the alkoxy terminated organopolysiloxane is a methyldimethoxy terminated polydimethylsiloxane.

7. A room temperature vulcanizable composition in accordance with claim 1, where the condensation catalyst is a tin compound.

8. A room temperature vulcanizable composition in accordance with claim 1, where the cross-linking polyalkoxysilane is a polymethoxysilane.

9. A room temperature vulcanizable composition in accordance with claim 1, where the amine accelerator is di-N-hexylamine.

10. A room temperature vulcanizable composition in accordance with claim 1, where the organic scavenger is a lactone.

11. A room temperature vulcanizable composition in accordance with claim 1, where the organic scavenger is an enolether.

12. A method for making a room temperature vulcanizable composition which comprises agitating under substantially anhydrous conditions at a temperature in the range of from 0° C. to 180° C. a mixture of ingredients comprising (A) a silanol terminated polydiorganosiloxane
(B) an effective amount of a condensation catalyst
(C) 0.001 to 0.1 part per part of the silanol terminated polydiorganosiloxane of a cross-linking polyalkoxysilane
(D) from 0 to 0.1 part per part of the silanol terminated polydiorganosiloxane of an amine accelerator
(E) a stabilizing amount of a silicon-free organic scavenger for hydroxy containing material.

13. A method for making a room temperature vulcanizable composition which comprises agitating under substantially anhydrous conditions at a temperature in the range of from 0° C. to 180° C. a mixture of ingredients comprising (A) an organopolysiloxane wherein the silicon atom at each polymer chain end is terminated with at least one alkoxy radical,
(B) an effective amount of a condensation catalyst
(C) 0 to 0.1 part per part of the alkoxy terminated organopolysiloxane of a cross-linking polyalkoysilane
(D) from 0 to 0.1 part per part of the alkoxy terminated organopolysiloxane of an amine accelerator
(E) a stabilizing amount of a silicon-free organic scavenger for hydroxy containing material.

* * * * *